United States Patent [19]
Ueda et al.

[11] Patent Number: 4,619,226
[45] Date of Patent: Oct. 28, 1986

[54] INTAKE DEVICE FOR INTERNAL COMBUSTION ENGINE

[75] Inventors: Kazuhiko Ueda; Mitsuo Hitomi; Junzo Sasaki, all of Hiroshima, Japan

[73] Assignee: Mazda Motor Corporation, Japan

[21] Appl. No.: 683,836

[22] Filed: Dec. 19, 1984

[30] Foreign Application Priority Data

Dec. 21, 1983 [JP] Japan ................. 58-242698
Dec. 21, 1983 [JP] Japan ................. 58-242699
Dec. 28, 1983 [JP] Japan ................. 58-248254
Apr. 20, 1984 [JP] Japan ................. 59-80919

[51] Int. Cl.$^4$ ............................................. F02B 75/06
[52] U.S. Cl. ........................... 123/52 MB; 123/52 MC; 123/432
[58] Field of Search ......... 123/52 M, 52 MB, 52 MC, 123/432

[56] References Cited

U.S. PATENT DOCUMENTS

| | | | |
|---|---|---|---|
| 2,835,235 | 5/1958 | Gassmann | 123/52 M |
| 3,177,854 | 4/1965 | Garcea | 123/52 M |
| 4,300,504 | 11/1981 | Tezuka | 123/52 M |
| 4,446,823 | 5/1984 | Bessho | 123/52 MB |
| 4,471,615 | 9/1984 | Kasuya | 123/52 M |
| 4,515,115 | 5/1985 | Okubo | 123/52 MB |

FOREIGN PATENT DOCUMENTS

| | | | |
|---|---|---|---|
| 253305 | 4/1967 | Austria | 123/52 MV |
| 56-2023 | 1/1981 | Japan | |
| 57-22629 | 2/1982 | Japan | |

*Primary Examiner*—Craig R. Feinberg
*Attorney, Agent, or Firm*—Gerald J. Ferguson, Jr.; James E. Bryan; Michael P. Hoffman

[57] ABSTRACT

A hollow drum-like surge tank is supported for rotation in a casing. The surge tank communicates with the atmosphere by way of an opening formed in one end thereof and with the interior space of the casing by way of communicating holes formed in the peripheral surface of the surge tank. Intake pipes curl downwardly from intake ports of an engine and communicate with the internal space of the casing, whereby intake passages for the engine are formed through the surge tank, the interior space of the casing and the intake pipes. The surge tank is rotated back and forth about the longitudinal axis thereof, the amount of rotation depending on the engine speed, so that the distance between the communicating holes and the position in which the intake pipes communicate with the interior space of the casing is changed according to the engine speed, thereby changing the effective lengths of the intake passages for the engine according to the engine speed.

8 Claims, 16 Drawing Figures

INTAKE DEVICE FOR INTERNAL COMBUSTION ENGINE

BACKGROUND OF THE INVENTION

1. Field of the Invention

This invention relates to an intake device for an internal combustion engine, and more particularly to an intake device for an internal combustion engine in which the effective length of the intake passage for each cylinder is variable.

2. Description of the Prior Art

As is well known, by utilizing the so-called inertia effect of intake gas, the volumetric efficiency of an internal combustion engine can be improved whereby the output power of the engine can be enhanced. The intake inertia effect depends upon the length of the intake passage of the engine and the engine speed, that is, the length of the intake passage at which the intake inertia effect is maximized varies with the engine speed. More particularly, as the engine speed is increased, the length of the intake passage at which the inertia effect is maximized becomes short. Thus, there have been proposed intake devices in which the effective length of the intake passage can be varied according to the engine speed (Such intake devices will be referred to as a "variable length intake device", hereinbelow.) to effectively utilize the intake inertia effect over a wide range of engine speeds as disclosed in Japanese Unexamined Utility Model Publication Nos. 56(1981)-2023 and 57(1982)-22629.

However, the variable length intake devices disclosed in these Japanese Utility Model Publications are disadvantageous in that the size of the device must be large in order to make the length of the intake passage variable by a desired degree because the length of the intake passage is changed by sliding a movable pipe fitted into a fixed pipe in the longitudinal direction of the pipes, and in that, in the case of a multiple-cylinder engine, the number of parts is substantially increased and a complicated driving mechanism is required because a separate intake passage is needed for each cylinder and each intake passage must be independently variable in length.

In U.S. Pat. No. 2,835,235, there is disclosed a variable length intake device which may be considered to be advantageous over those disclosed in the above mentioned Japanese Unexamined Utility Model Publications in compaction and simplicity of structure. In the variable length intake device, intake air is introduced into each cylinder through a drum-like rotary member and an intake pipe which has an arcuate end and is connected to the cylinder at the other end. The rotary member is attached to the arcuate end of the intake pipe to be rotatable about the longitudinal axis thereof with the peripheral surface of the rotary member sliding on the arcuate end in airtight fashion. The rotary member has an inlet portion in direct communication with the atmosphere and an outlet opening which opens in the arcuate end of the intake pipe. By rotating the rotary member, the position of the outlet opening of the rotary member through which air or air-fuel mixture flows into the intake pipe is changed with respect to the intake pipe so that the effective distance over which air or air-fuel mixture must travel before it reaches the cylinder after flowing into the intake pipe is changed, i.e. the effective length of the intake passage is changed. This variable length intake device may be considered to be more compact and simpler in structure than those of the Japanese Publications, because in the former the effective length of the intake passage is changed through rotation of a member while in the latter the effective length of the intake passage is changed through lengthwise movements of pipes. However, the variable length intake device of the U.S. patent is apt to add to the overall height of the engine due to the fact that the intake pipe upwardly arcs at the arcuate end thereof. That is, because the intake valve is positioned in the upper portion of the combustion chamber, the intake pipe is generally arranged to extend obliquely upwardly and accordingly the intake-manifold-length adjusting member or the drum-like rotary member is positioned relatively high above the combustion chamber to add to the overall height of the engine. Especially, when the drum-like rotary member is used as a surge tank having a sufficient volume, the rotary member must have a substantial volume, which further adds to the overall height of the engine. When the position of the rotary member is lowered in order to reduce the overall height of the engine, the intake pipe must be bent sharply between the intake port of the cylinder and the rotary member, which prevents smooth flow of intake gas.

SUMMARY OF THE INVENTION

In view of the foregoing observations and description, the primary object of the present invention is to provide a variable length intake device for an internal combustion engine which is compact in structure and does not substantially add to the overall size of the engine.

Another object of the present invention is to provide a variable length intake device for an internal combustion engine which can be applied to a multiple-cylinder engine without substantially complicating the structure of the engine.

Still another object of the present invention is to provide a variable length intake device in which the mechanism for adjusting the length of the intake passage is simple in structure.

Still another object of the present invention is to provide a variable length intake device which can be low in profile and at the same time can ensure smooth flow of intake gas.

In accordance with the present invention, there is provided an intake device for an internal combustion engine having a plurality of cylinders comprising a casing having an internal space, a surge tank which is substantially cylindrical in shape and is supported in the casing for rotation about its longitudinal axis, the surge tank having an opening communicating with the atmosphere for drawing air into the internal space of the surge tank and a plurality of communicating holes formed in the peripheral surface thereof to communicate with the internal space of the casing, a plurality of separate intake passages which extend from the respective cylinders to the upper portion of the casing and open in the interior space of the casing at the respective communicating portions, whereby extensions of the respective separate intake passages which downwardly spiral in the interior surface of the casing and communicate the respective separate intake passages with the interior space of the surge tank are formed, and a surge tank driving means for rotating the surge tank about its longitudinal axis to change the distance between the communicating holes of the surge tank and the respective communicating portions according to the operating condition of the engine.

In the variable length intake device of the present invention, the overall height of the engine can be relatively low without sharply bending the intake passage between each cylinder and the surge tank because the intake passages are arranged to spiral downwardly and therefore the surge tank can be positioned below the intake pipes extending from the intake ports of the engine.

In one preferred embodiment of the present invention, said extensions of the respective separate intake passages are separated from each other by partition walls which extend in the circumferential direction of the surge tank and are formed integrally with the casing and the surge tank is rotated on the free end surfaces of the partition walls. This arrangement is advantageous over an arrangement in which the partition walls are formed integrally with the surge tank to outwardly project therefrom and the surge tank is rotated with the free end surfaces of the partition wall sliding on the inner surface of the casing, in that the peripheral length of the sliding portion is shorter in the former arrangement than in the latter arrangement, thereby facilitating sealing at the sliding portion and lowering the sliding resistance at the sliding portion.

DESCRIPTION OF THE PREFERRED EMBODIMENT

Figure 1:
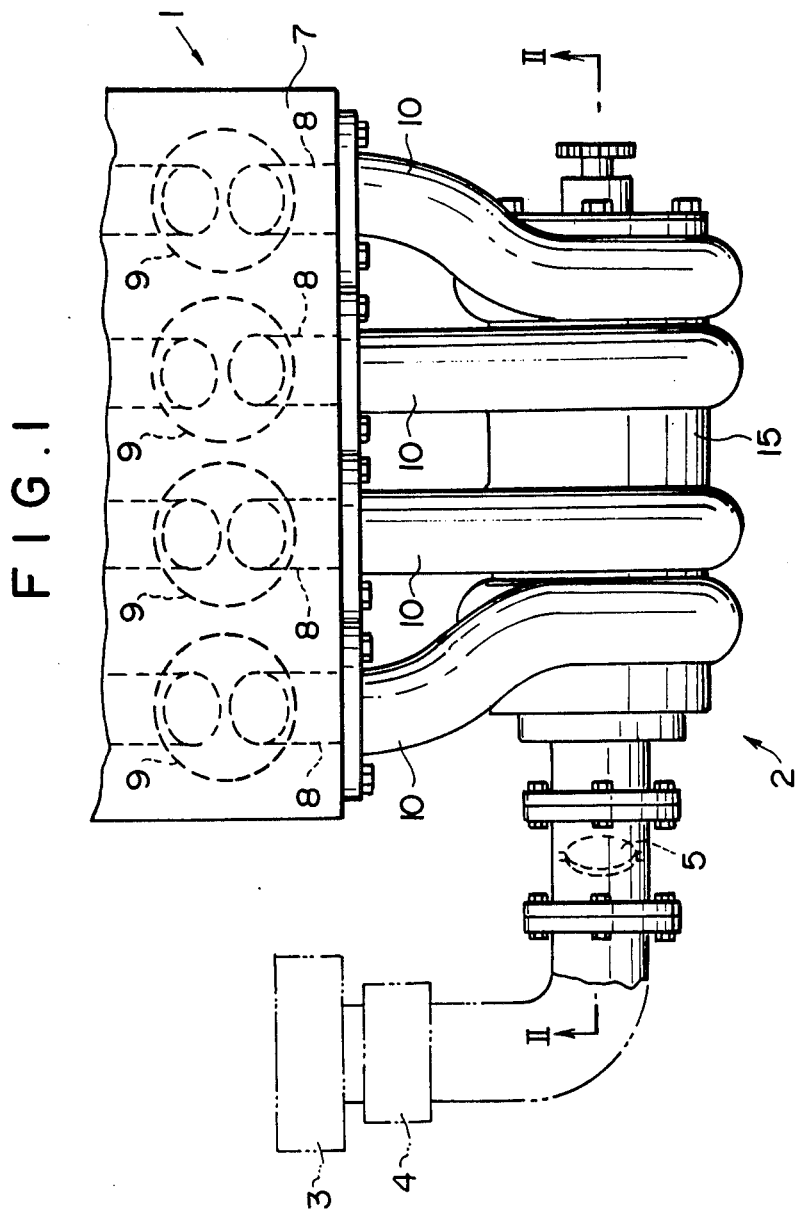
FIG. 1 is a schematic plan view of an engine employing an intake device in accordance with an embodiment of the present invention.
Figure 2:
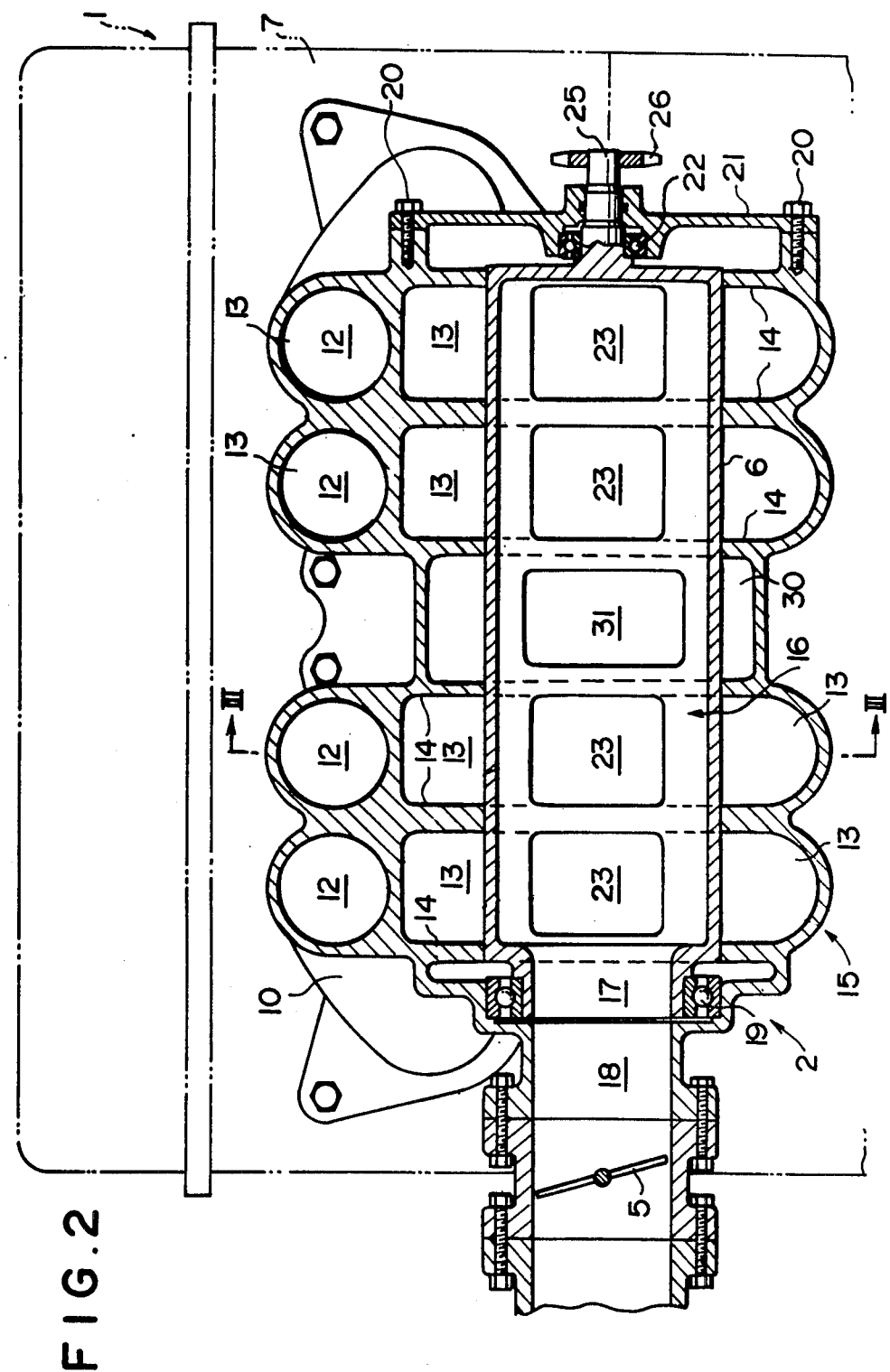
FIG. 2 is a cross-sectional view taken along line II—II in FIG. 1.
Figure 3:
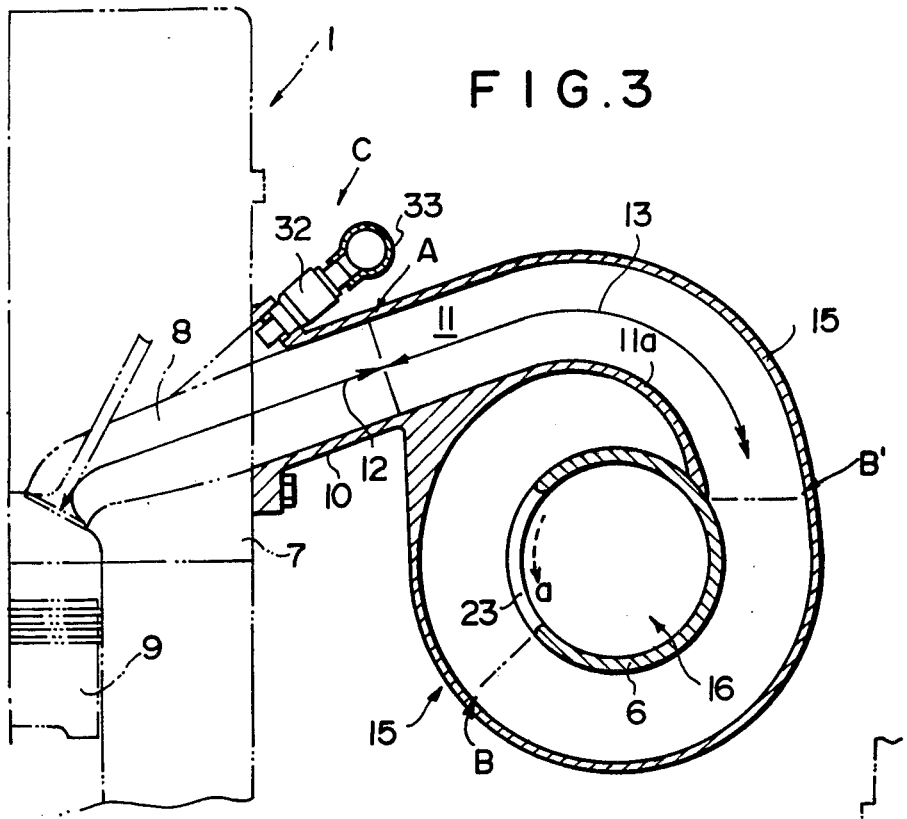
FIG. 3 is a cross-sectional view taken along line III—III in FIG. 2.

In FIGS. 1 to 3, a variable length intake device 2 in accordance with an embodiment of the present invention is disposed on one side of the engine 1. The intake device 2 comprises a drum-like rotary surge tank 6 (FIG. 2) into which intake air is introduced through an air cleaner 3, an airflow meter 4 and a throttle valve 5, and a plurality (four in this particular embodiment) of separate intake passages 11 (FIG. 3) branched from the surge tank 6 for introducing the intake air in the surge tank 6 into cylinders 9 through intake ports 8 formed in a cylinder head 7.

The rotary surge tank 6 is mounted for rotation in a casing 15 as will be described in more detail later, and four intake pipes 10 are integrally formed with the casing 15. Each separate intake passage 11 comprises a main portion 12 extending through the intake pipe 10 and an extension 13 defined between the outer surface of the surge tank 6 and the inner surface of the casing 15. As clearly shown in FIG. 3, the extension 13 downwardly spirals along the outer peripheral surface of the surge tank 6 and merges into the main portion 12 of the separate intake passage 11 substantially in line therewith above the surge tank 6 at the connection A between the casing 15 and the intake pipe 10. As clearly shown in FIG. 2, the extensions 13 of the adjacent separate intake passages 11 are separated from each other by partitions 14 inwardly projecting from the inner surface of the casing 15.

The rotary surge tank 6 is mounted in the casing 15 to extend in the longitudinal direction thereof. The surge tank 6 has an open end 17, and the internal space 16 of the surge tank 6 communicates with the atmosphere by way of the open end 17, an inlet 18 of the casing 15, the throttle valve 5, the airflow meter 4 and the air cleaner 3. The surge tank 6 is supported for rotation in the casing 15, that is, the open end 17 is rotatably supported by the casing 15 by way of a bearing 19 and the other end or closed end of the surge tank 6 is rotatably supported by a bearing 22 which is mounted on a side cover 21 fixed to the casing 15 by bolts 20. As clearly shown in FIG. 2, a substantially annular compartment 30 is defined at the center of the casing 15 between the ends or between the intake passages 11 for the second and third cylinders as numbered from one end of the cylinder head in FIG. 1. The purpose of the compartment 30 will become apparent later. The rotary surge tank 6 is provided, in the peripheral surface thereof, with four communicating holes 23 which respectively open in the extensions 13 of the intake passages 11 thereby communicating the internal space 16 of the surge tank 6 with the intake pipes 10 by way of the respective extensions 13. Intake air is introduced into each extension 13 from the internal space 16 of the surge tank 6 through the communicating hole 23 and then introduced into the cylinder 9 through the intake pipe 10. Accordingly, by rotating the rotary surge tank 6, the distance over which the intake air must travel after passing through the communicating hole 23 before flowing into the cylinder 9 can be changed, i.e. the effective length of the intake passage can be changed.

The rotary surge tank 6 is driven by a driving mechanism 24 (see FIG. 4) to change the effective length of the intake passage according to the engine speed. The driving mechanism 24 is mounted on the outer surface of the end of the casing 15 remote from the open end 17 of the surge tank 6, and comprises an input gear 26 fixedly mounted on a shaft 25 which is formed integrally with the surge tank 6 and projects outside through the side cover 21, a sector gear 27 in mesh with the input gear 26, and a diaphragm 29 which drives the sector gear 27 by way of a lever 28. The diaphragm 29 is driven by exhaust pressure imparted thereto from the exhaust passage (not shown) of the engine 1. Because the exhaust pressure becomes higher as the engine speed is increased and lower as the engine speed is reduced, the disphragm 29 is moved rightward in FIG. 4 as the engine speed is increased. When the diaphragm 29 is moved rightward, the sector gear 27 is swung in the direction of the arrow a to rotate the input gear 26 in the direction of the arrow a in FIG. 4, thereby rotating the surge tank 6 in the direction of the arrow a in FIG. 3 to shorten the effective length of the intake passage.

Said compartment 30 is communicated with the internal space 16 of the surge tank 6 by way of a communicating hole 31 formed in the peripheral surface of the surge tank 6 at the intermediate portion thereof. The compartment 30 may be used for recirculating exhaust gas uniformly to the cylinders 9, or may be used for stably taking out intake vacuum for various controls. Reference numeral 32 denotes a fuel injection valve for injecting fuel fed through a fuel feed pipe 33 into the intake passage 11. A separate fuel injection valve is provided for each intake passage 11. The casing 15 and the surge tank 6 are arranged so that the surge tank 6 can be easily incorporated into the casing 15 by removing the side cover 21 and inserting the surge tank 6 into the casing 15. In this connection, the arrangement of this embodiment in which the partitions 14 are integral with the casing 15 is advantageous over an arrangement in which the partitions 14 are formed otherwise.

During operation of the engine 1, intake air drawn through the air cleaner 3 is introduced into the surge tank 6 by way of the airflow meter 4 and the throttle valve 5, and then introduced into the cylinders 9 by way of the respective intake pipes 10 and intake ports 8.

The intake air is once introduced into the interior space 16 of the surge tank 6 through the inlet 18 of the casing 15 and the open end 17 of the surge tank 6 and then flows into the respective intake passages through the communicating holes 23 of the surge tank 6. Because the extensions 13 of the intake passages 11 are separated from each other by the partitions 14, the intake air branches from the interior space 16 of the surge tank 6 at the communication portion (indicated at B in FIG. 3), that is, each cylinder 9 has a separate intake passage extending from the communication portion B via said connection A.

Figure 4:
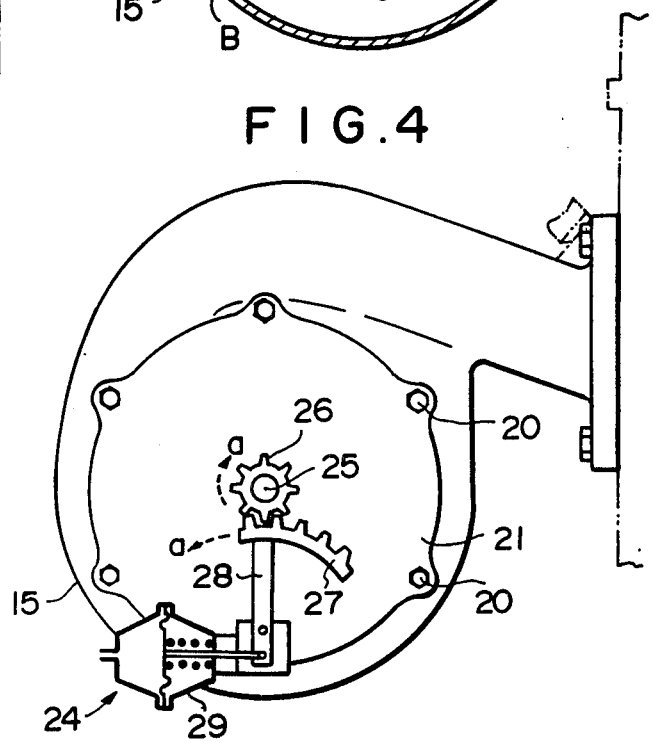
FIG. 4 is an end view of the intake device showing the driving mechanism thereof.

When the engine speed is low and the exhaust pressure imparted to the diaphragm 29 of the driving mechanism 24 shown in FIG. 4 is low, the surge tank 6 is in a clockwise (as seen in FIG. 3) rotated position. On the other hand, when the engine speed is increased and the exhaust pressure imparted to the disphragm 29 is increased, the surge tank 6 is rotated in the counterclockwise direction or the direction of the arrow a in FIG. 3 by way of the engagement between the input gear 26 and the sector gear 27, whereby the communicating portion B is moved counterclockwise to the position indicated at B' in FIG. 3. That is, the effective length of the separate intake passage between the surge tank 6 and the cylinder 9 can be changed by the distance between the positions respectively indicated at B and B' in FIG. 3. Therefore, by arranging the driving mechanism so that the effective length of the separate intake passage is always adjusted to a value optimal for the engine speed, the intake inertia effect can be effectively utilized over a wide range of engine speeds extending from low speed to high speed.

As the effective length of the intake passage is changed through rotation of the rotary surge tank 6, the effective length of the intake passage can be changed by a large amount without substantially increasing the overall size of the intake device. Further, all the intake passages for the respective cylinders can be simultaneously changed in effective length by simply rotating the single rotary surge tank 6, the driving mechanism 24 can be simple in structure and can be constituted of a relatively small number of components.

Because the intake passage from the cylinder 9 to the surge tank 6 (i.e. the main portion 12 and the extension 13 thereof) spirals downwardly from the upper portion of the casing 15, and the surge tank 6 of a relatively large volume extends downwardly, the top of the casing 15 can be positioned relatively low without sharply bending the intake passage. Accordingly, smooth flow of intake gas can be ensured without substantially increasing the overall height of the engine.

Because the surge tank 6 extends downward from the intake pipes 10, a wide space C remains above the intake pipes 10 and below the top of the engine 1, and the fuel injection valves 32 can be disposed on the upper side of the intake pipes 10. It is generally preferred that the fuel injection valves be disposed on the upper side of the intake pipes 10 in order to facilitate attachment of the fuel injection valves and to prevent clogging.

As can be understood from FIG. 2, the rotary surge tank 6 is supported in the interior space of the casing 15 which is sealed off from the atmosphere exept by way of the air cleaner 3 in the embodiment described above. This arrangement is advantageous in that the seal between the extensions 13 of the intake passages and the same between the rotary surge tank 6 and the casing 15 are able to prevent interference of pulsating pressure waves and no positive seal is necessary. In this connection, the arrangement in which the partitions 14 are formed integrally with the casing is advantageous in that the peripheral length of the sliding portion between the surge tank 6 and the casing 15 is shorter than that in the arrangement in which the partitions are formed on the surge tank, whereby the seal between the surge tank and the casing is further facilitated.

Figure 5:
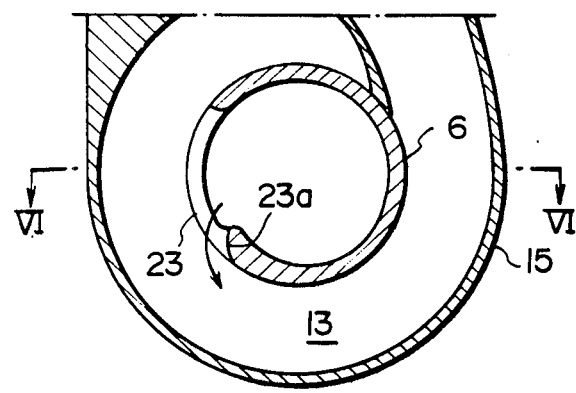
FIG. 5 is a schematic cross-sectional view for illustrating a modification of the intake device of FIG. 1.
Figure 6:
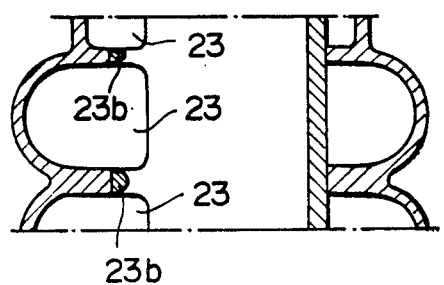
FIG. 6 is a fragmentary cross-sectional view taken along line VI—VI in FIG. 5.

It is preferred that the downstream side edge of the communicating hole 23 be shaped so as to permit intake air to smoothly flow into the extension 13 of the intake passage through the communicating hole 23 as indicated at 23a in FIG. 5, thereby reducing the flow resistance. For the same reason, each partition wall 23b between adjacent communicating holes 23 has an inwardly rounded cross-sectional shape as shown in FIG. 6.

Figure 7:
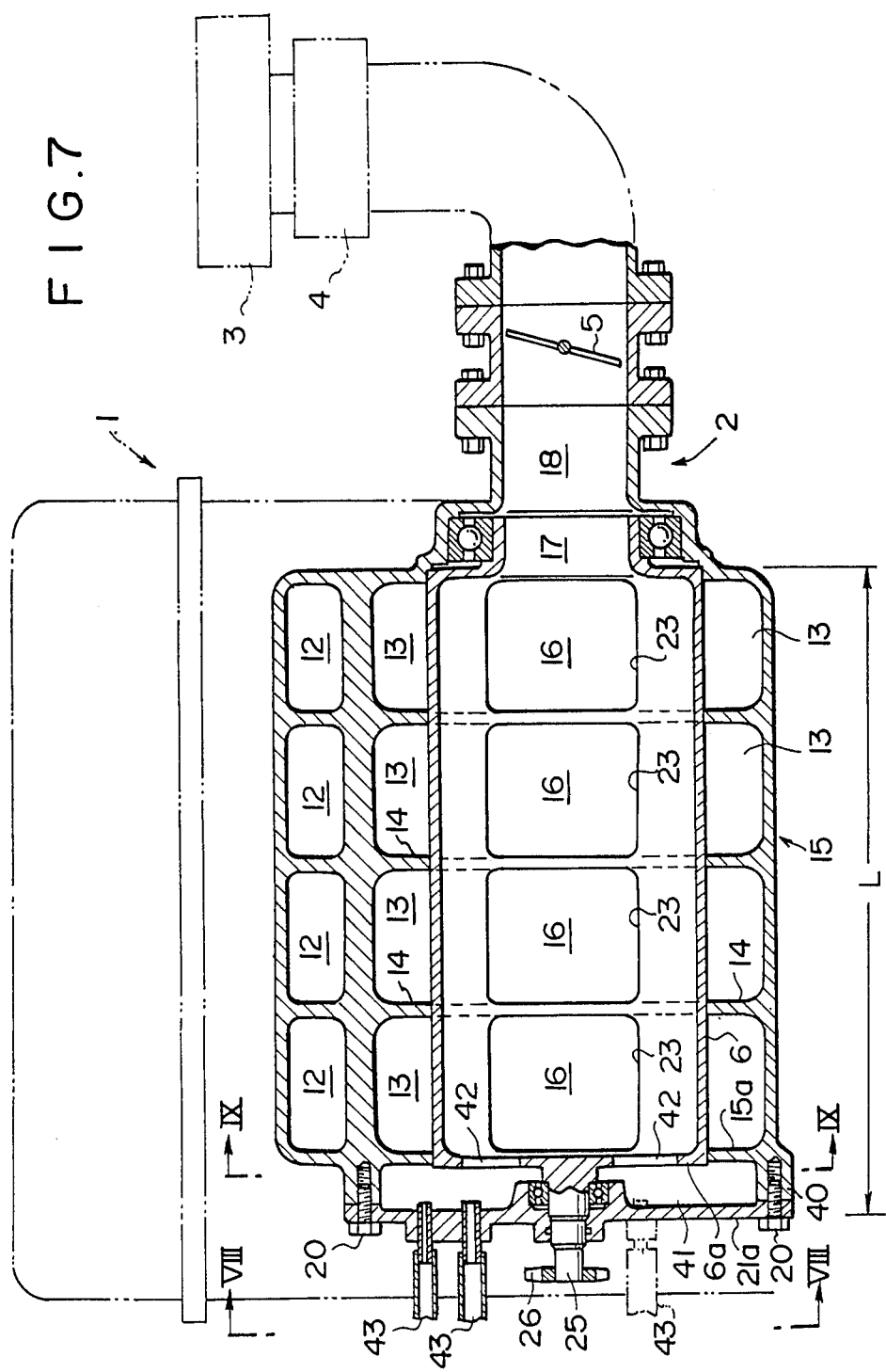
FIG. 7 is a cross-sectional view similar to FIG. 2 but showing another embodiment of the present invention.
Figure 8:
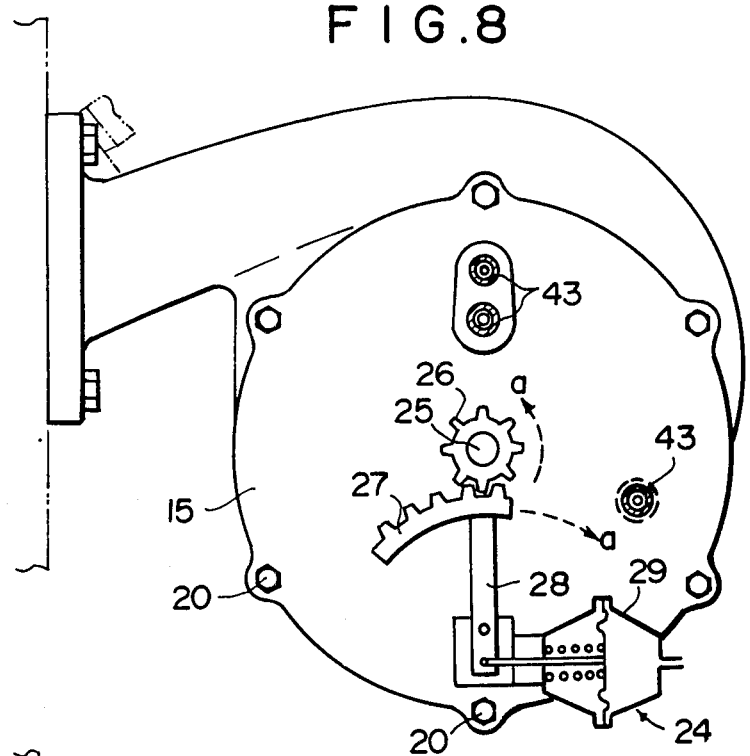
FIG. 8 is an end view taken along line VIII—VIII in FIG. 7.
Figure 9:
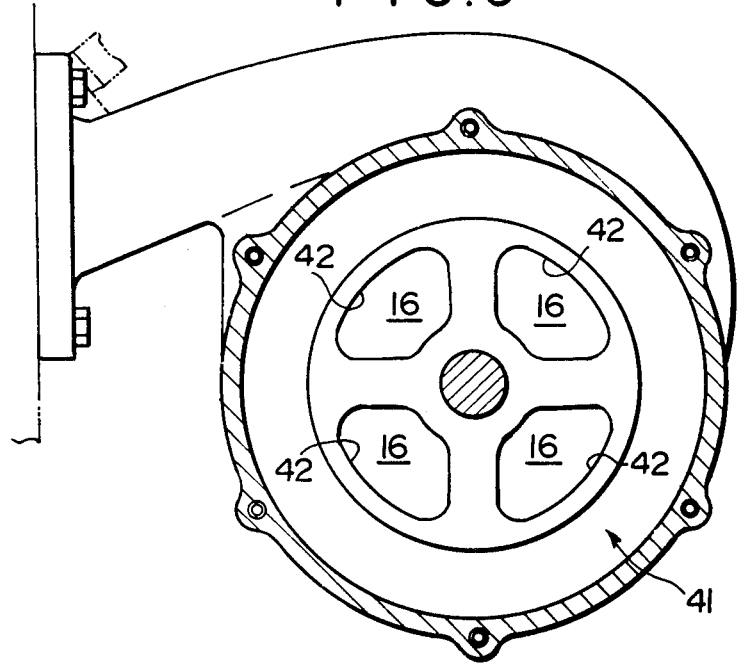
FIG. 9 is a cross-sectional view taken along line IX—IX in FIG. 7.

Though in the embodiment shown in FIGS. 1 to 4 the compartment 30 which may be used for recirculating exhaust gas and stably taking out intake vacuum, for instance, is formed between an intermediate portion of the casing 15, the space between the side cover 21 and the oppposed end of the casing 15 may, instead, be used for the purposes as shown in FIGS. 7 to 8. In FIGS. 7 to 9, the parts analogous to those in FIGS. 1 to 4 are given the same reference numerals and will not be described here.

In FIGS. 7 to 9, a side cover 21a is fixed to an annular wall portion 40 formed on the end of the casing 15 remote from the open end 17 of the surge tank 6 by means of bolts 20, whereby annular compartment 41 is formed between the inner surface of the side cover 21a and the end surface 15a of the casing 15 and between the inner surface of the side cover 21a and the end surface 6a of the surge tank 6. As clearly shown in FIG. 9, the end surface 6a of the surge tank 6 is provided with four communicating holes 42 which communicate the space in the annular compartment 41 with the interior space 16 in the surge tank 6. Reference numerals 43 respectively denote pipes which communicate with the compartment 41 in order to recirculate exhaust gas to the cylinders or to take out intake vacuum for controlling the pressure of fuel, ignition timing or exhaust gas recirculation or to introduce blow-by gas into the cylinders. The compartment 41 of this embodiment is advantageous over the compartment 30 in the embodiment shown in FIGS. 1 to 4 in that overall axial length of the casing can be made shorter and the number of partitions can be reduced thereby simplifying the structure. In both the embodiments described above, by taking out the intake vacuum from the surge tank 6, the pressure which represents the synthetic intake vacuum of all the cylinders, there can be obtained a stable intake vacuum which is free from pulsation and accordingly appropriate for various controls. Further, by introducing exhaust gas and/or blow-by gas into the cylinders by way of the surge tank, the gas can be uniformly distributed to the cylinders.

Figure 10:
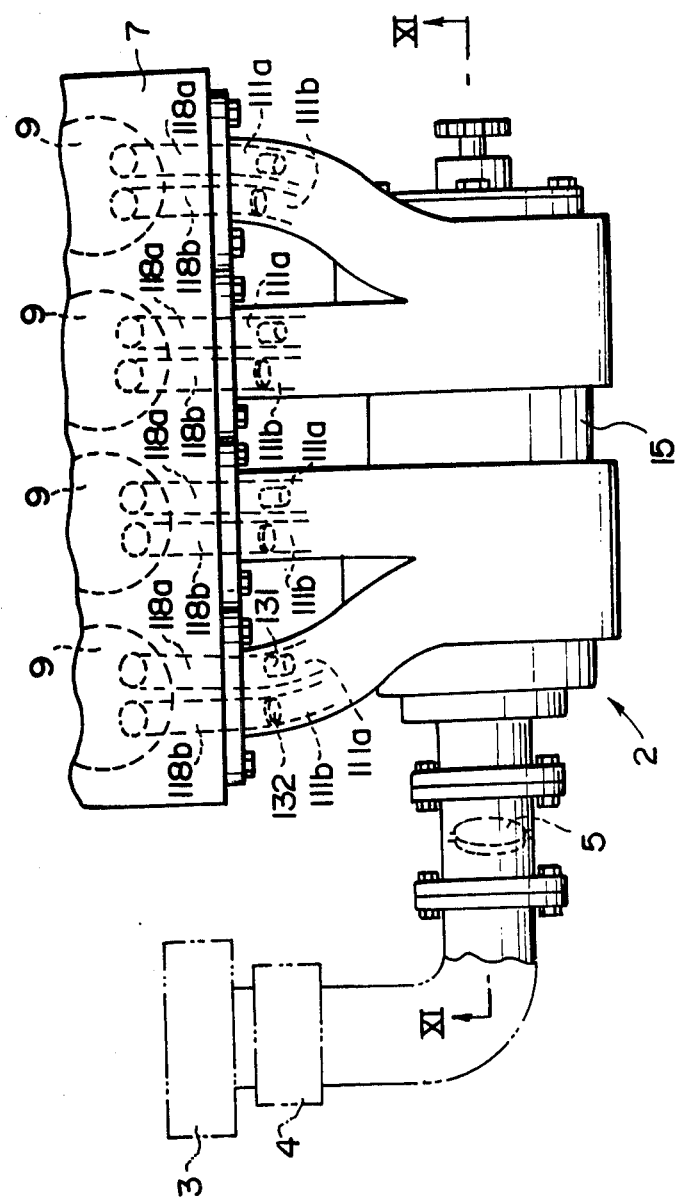
FIG. 10 is a plan view similar to FIG. 1 but showing a still another embodiment of the present invention.
Figure 11:
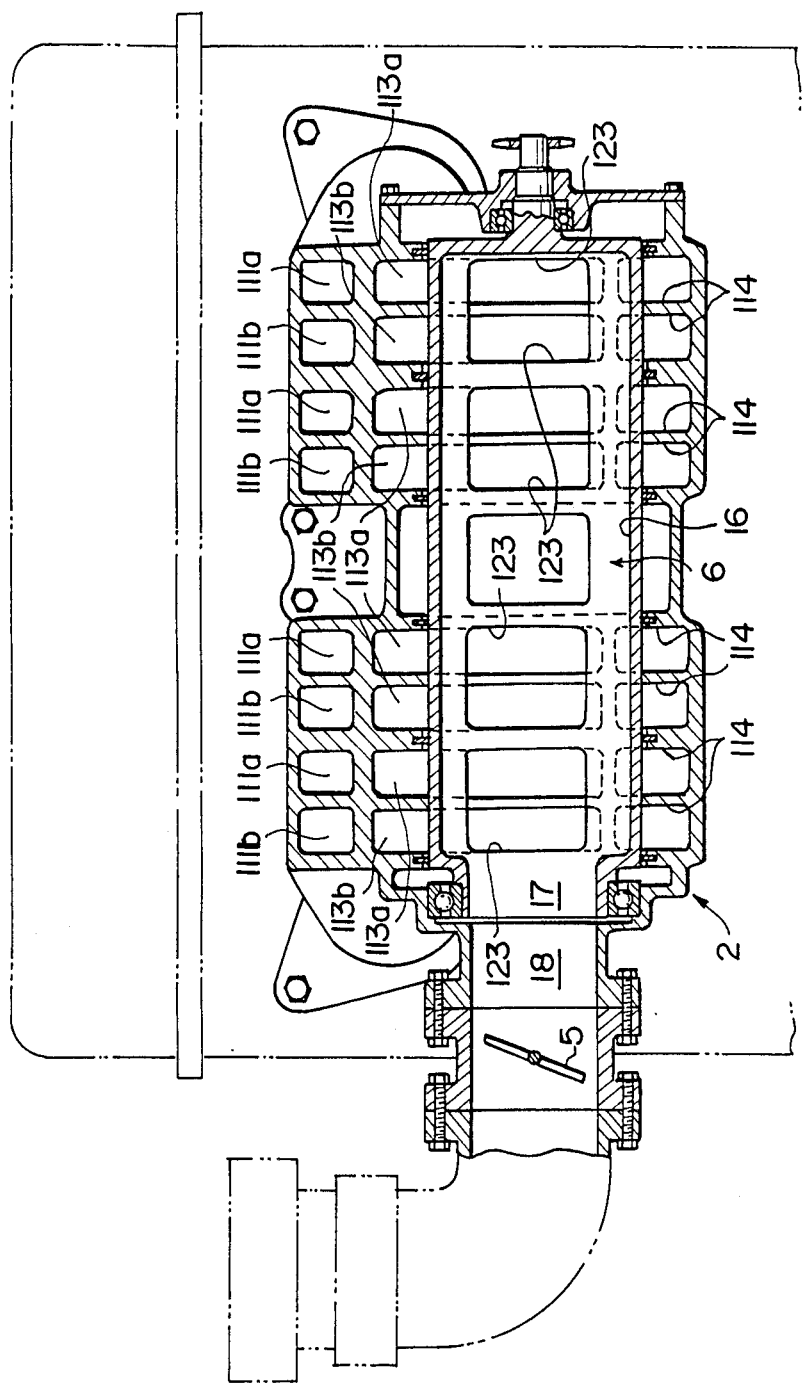
FIG. 11 is a cross-sectional view taken along line XI—XI in FIG. 10, and FIGS. 12 to 16 are schematic views for illustrating various modifications of the intake device shown in FIGS. 10 and 11.

In another embodiment of the present invention shown in FIGS. 10 and 11, not only the effective length but also the cross-sectional area of the intake passage for each cylinder is changed according to the operating condition of the engine, thereby making better use of the intake inertia effect over a wider operating range of the engine. The variable length intake device of this embodiment is similar to the embodiment shown in FIGS. 1 to 4, and therefore, the parts analogous to those in FIGS. 1 to 4 are given the same reference numerals and will not be described in detail here. The most important difference between this embodiment and that of FIGS. 1 to 4 is that a pair of intake ports are provided for each cylinder. As shown in FIG. 10, each cylinder 9 is provided with first and second intake ports 118a and 118b which are communicated with the interior space 16 of the rotary surge tank 6 by first and second intake passages 111a and 111b, respectively. The first and second intake passages 111a and 111b are separated from each other by a partition wall 114. Similarly to the intake passages 11 in the embodiment shown in FIGS. 1 to 4, the intake passages 111a and 111b are provided with extensions 113a and 113b extending in the casing 15. The extensions 113a and 113b communicate with the interior space 16 of the surge tank 6 through a communicating hole 123 which is common to the first and second intake passages 111a and 111b. That is, four communicating holes 123 are formed in the peripheral surface of the surge tank 6, one for each cylinder 9.

A fuel injection nozzle 131 is disposed in each first intake passage 111a and a shutter valve 132 is disposed in each second intake passage 111b. The shutter valve 132 is actuated by a driving mechanism (not shown) to close the second intake passage 111b when the engine speed is lower than a predetermined value and to open the same when the engine speed is not lower than the predetermined value.

Now the operation of the intake device of this embodiment will be described.

When the engine speed is low, the surge tank 6 is positioned in a position similar to the position shown in FIG. 3 in which the effective length of the intake passages 111a and 111b is relatively long. As the engine speed is increased, the surge tank 6 is rotated to shorten the effective length of the first and second intake passages 111a and 111b. Until the engine speed reaches the predetermined value, the second intake passages 111b are closed and accordingly each cylinder 9 is communicated with the surge tank 6 only by way of the first intake passage 111a. When the engine speed reaches the predetermined value, the second intake passages 111b are opened whereby each cylinder 9 communicates with the surge tank 6 by way of both the first and second intake passages 111a and 111b, that is, the total cross-sectional area of the intake passage for each cylinder 9 is widened. The intake passage for each cylinder is thus reduced in its effective length and increased in its cross-sectional area as the engine speed is increased. Generally, it is preferred that the effective length of the intake passage be shortened and the effective cross-sectional area of the same be windened as the engine speed increases for the best use of the intake inertia effect.

In an alternative mode of control by the surge tank 6 and the shutter valve 132, the surge tank 6 is fully rotated to minimize the effective length of the first intake passage 111a with the second intake passage 111b kept closed until the engine speed increases to a predetermined value. When the engine speed reaches the predetermined value, the shutter valve 132 is opened and at the same time, the surge tank 6 is returned to the original position in which the effective length of the intake passages is longest. Thereafter, as the engine speed further increases, the surge tank 6 is rotated to again shorten the effective length of the intake passages.

Figure 12:
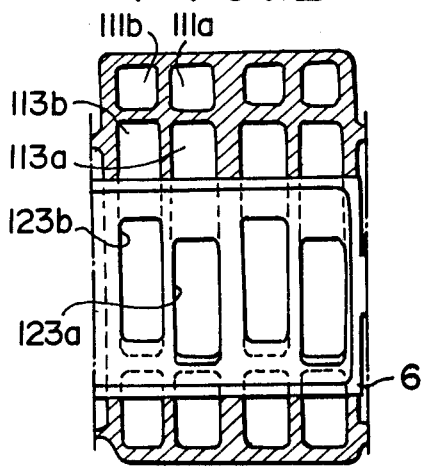

Though in the embodiment shown in FIGS. 10 and 11, the first and second intake passages 111a and 111b for each cylinder communicate with the interior space 16 of the surge tank 6 by way of the single communicating hole 123 which is common to both the intake passages, the first and second intake passages 111a and 111b for each cylinder may be communicated with respective separate communicating holes 123a and 123b as shown in FIG. 12. In this case, the communicating holes 123a and 123b may be shifted from each other in the circumferential direction of the surge tank 6 as shown in FIG. 12, if desired.

Figure 13:
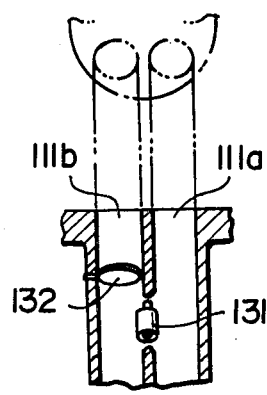
Figure 14:
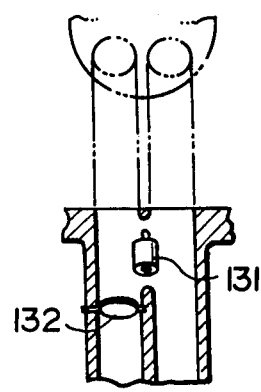

In the modification shown in FIG. 13, a part of the partition walls between the first and second intake passages 111a and 111b is cut away and the fuel injection nozzle 131 is positioned in the cutaway portion so that fuel is uniformly distributed to both the first and second intake passages 111a and 111b when the shutter valve 132 in the second intake passage 111b is opened. If desired, the fuel injection nozzle may be directed to the first intake passage 111a to some extent so that a large amount of fuel does not stay in the second intake passage upstream of the shutter valve 132 when the shutter valve 132 is closed. Otherwise, the fuel injection nozzle 131 may be disposed downstream of the shutter valve 132 as shown in FIG. 14.

Figure 15:
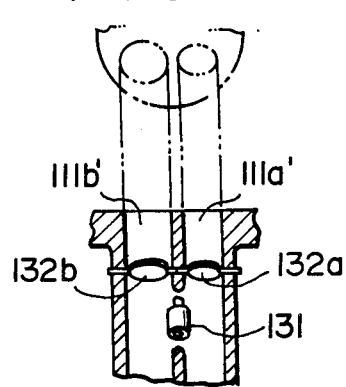

In the modification shown in FIG. 15, the first intake passage (111a') has a smaller cross-sectional area than the second intake passage (111b'), and both the intake passages 111a' and 111b' are provided with shutter valves 132a and 132b, respectively, the fuel injection nozzle 132 being positioned in a cutaway portion of the partition walls between the first and second intake passages 111a' and 111b' upstream of the shutter valves 132a and 132b. In this modification, as the engine speed increases, the rotary surge tank 6 is first rotated to shorten the effective length of the intake passages with only the first intake passage 111a opened. As the engine speed further increases, the first intake passage 111a' is closed and the second intake passage 111b', which is wider than the first intake passage 111a', is opened and then the surge tank 6 is returned to the original position in which the effective lengths of the intake passages are maximum. Then the rotary surge tank 6 is gradually rotated to shorten the effective length of the second intake passage 111b' as the engine speed further increases. When the engine speed further increases, both the intake passages 111a' and 111b' are opened and then the surge tank 6 is returned to the original position. Then the surge tank 6 is again rotated to shorten the effective lengths of both the intake passages 111a' and 111b' as the engine speed further increases. Thus in this modification, the effective cross-sectional area of the intake passage for each cylinder is changed in three steps and in each step the effective length of the intake passage is gradually shortened as the engine speed increases, thereby making much better use of the intake inertia effect.

Figure 16:
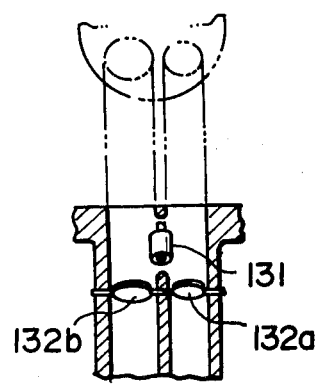

The fuel injection nozzle 132 may be positioned downstream of the shutter valves 132a and 132b as shown in FIG. 16.

We claim:

1. An intake device for an internal combustion engine having a plurality of cylinders comprising a casing having an internal space disposed at one side of the engine, a surge tank which has a cylindrical outer surface and is completely enclosed within the casing for rotation about its longitudinal axis, the surge tank having an opening communicating with atmosphere for drawing air into an internal space of the surge tank, a plurality of separate intake passages which extend from the respective cylinders to an upper portion of the casing and open in an interior space of the casing at respective communicating portions, extensions of the respective separate intake passages are composed of an interior surface of the casing and the cylindrical outer surface of the surge tank which the interior surface of the casing inwardly spirals overlappingly and communicates the respective separate intake passages with an interior space of the surge tank, hole means formed in the cylindrical surface of the surge tank to communicate each of said extensions with the internal space of the surge tank, and a surge tank driving means for rotating the surge tank about its longitudinal axis to change an effective distance between the hole means of the surge tank and the respective communicating portions according to an operating condition of the engine.

2. An intake device as defined in claim 1 in which a communicating hole is formed in a side wall of the casing to communicate with an interior space of the casing which communicates with the interior space of the surge tank, intake vacuum of the engine being taken out through the communicating hole.

3. An intake device as defined in claim 1 in which said extensions of the respective separate intake passages are separated from each other by circumferential partition walls which are integrally formed with the casing to project inwardly from the interior surface of the casing.

4. An intake device as defined in claim 3 in which a free end of each circumferential partition wall forms a circle having its center on the longitudinal axis of the surge tank.

5. An intake device as defined in claim 1 in which each cylinder is communicated with the surge tank by way of said plurality of said separate intake passages and at least one of the separate intake passages is provided with a control valve for controlling air flow therethrough.

6. An intake device as defined in claim 5 in which said separate intake passages, including said extensions, for each cylinder are equal to each other in length.

7. An intake device as defined in claim 5 in which said separate intake passages, including said extensions, for each cylinder differ from each other in length.

8. An intake device as defined in claim 7 in which said hole means comprises communicating holes formed in the cylindrical surface of the surge tank to be communicated with the respective separate intake passages are circumferentially offset from each other.

* * * * *